April 16, 1963     M. PULLING     3,085,783
VALVES
Filed Sept. 15, 1959
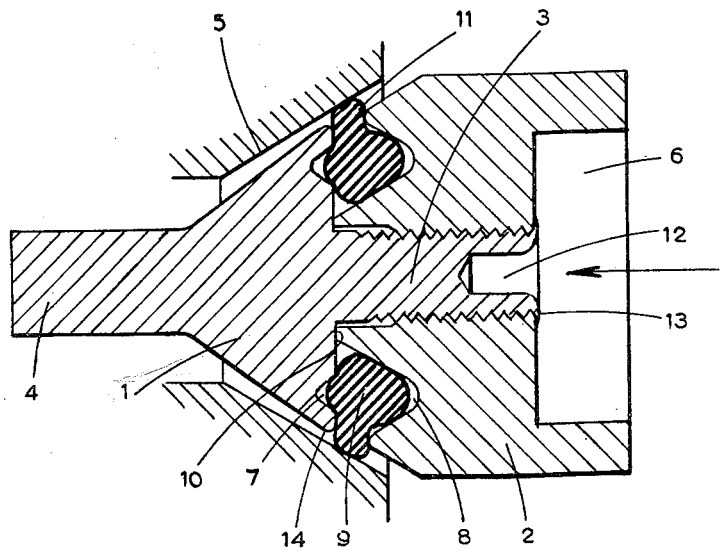
INVENTOR
MICHAEL PULLING
BY
Dean, Fairbull & Hirsch
ATTORNEYS 3,085,783
VALVES
Michael Pulling, Dorney, England, assignor to Damic Controls Limited, London, England
Filed Sept. 15, 1959, Ser. No. 840,149
Claims priority, application Great Britain Sept. 16, 1958
1 Claim. (Cl. 251—175)

This invention relates to valves of the kind including an axially slidable valve proper co-operating with a valve seating and is particularly applicable to charging valves in which the valve proper is maintained in position upon its seating by internal fluid pressure, and a helical or other type of spring, the valve being displaced from its seating by the pressure of the entering charging fluid. In such valves the valve often has to withstand a considerable pressure of fluid, and consequently it is absolutely essential to employ a valve seating which, although capable of compression under the pressure of the fluid to ensure a fluid tight seal will, nevertheless, not be likely to be damaged by the hammering action of the valve under the pressure of the contained fluid. Consequently, it is the practice to provide some form of stop means for limiting compression of the temporarily deformable seating.

Such valves as previously constructed in some cases included a fixed valve seating and a cooperating valve proper, the latter having an annular recess in the valve face in which a temporarily deformable sealing ring was located, which sealing ring under internal fluid pressure was temporarily compressed on the fixed valve seating, the valve face and seating abutting under excessive pressures to limit compression of the sealing ring.

The valve was conveniently formed in two parts, which parts between them formed the recess to receive the sealing ring.

The chief object of the present invention being to evolve a valve of an improved construction, and wherein there will be no possibility of the O type sealing ring being forced out of its recess under the pressure of the fluid.

A valve in accordance with the present invention is formed in two interconnected parts, which together provide the recess for the reception of the sealing ring. The degree to which the sealing ring lies protuberant of the valve face can be accurately determined by relative adjustment of the valve parts.

According to a further feature of the invention, the cross-sectional shape of the sealing ring is distorted as a result of tightening the valve parts, only a small part of the ring projecting from the recess, the bulk of the ring being trapped within the recess.

It is preferred to construct one part of the valve, for example the leading part, with a screw-threaded shank, which engages corresponding screw-threads of an internally screw-threaded axial boring in the other part, whereby the two parts as a result of relative rotation will be relatively displaced in an axial direction.

It will be appreciated that both parts will be recessed to provide the recess to receive the sealing ring and that as a result of the axial displacement the sealing ring will be forced outwardly to a greater or lesser extent so that it projects proud of the face of the valve a determined amount, it being very desirable that the extent to which the sealing ring projects above the valve face shall be very accurately determined and within fine limits, for example between 10/1,000 and 15/1,000 of an inch.

Reference will now be made to the accompanying drawing which shows on a considerably magnified scale a valve constructed in accordance with the invention cooperating with a seating of frusto-conical shape.

The valve is formed in two parts 1 and 2 the leading part 1 having a screw-threaded shank portion 3 which enters an internally screw-threaded axial boring in the part 2.

Part 1 has the usual forwardly directed spigot 4 which when pressed in the direction opposite to the arrow will cause the valve to be lifted from its associated seating 5 against which it is urged by means of a coil spring (not shown) entering a recess 6 in the part 2 of the valve.

The seating 5 is of frusto-conical shape, parts 1 and 2 of the valve being also of frusto-conical configuration.

Although the included angles of the seating and valve parts may be of any suitable dimensions it is preferred that the seating 5 and also the valve part 2 shall each have an included angle of 60° whilst valve part 1 shall have an included angle of 70°. As will be seen clearly the frusto-conical face of part 2 is stepped back in relation to the frusto-conical surface of part 1 so that it is well clear of the seating.

Part 1 is formed with an annular substantially V shaped groove 7 in its base whilst part 2 is formed with a complementary V groove 8 of considerably larger size, the two grooves together forming an annular recess in which the O type sealing ring 9 is located.

After the sealing ring has been placed around the threaded shank portion 3 part 2 is engaged with the screw-threaded shank portion 3 and rotated in the appropriate direction until an annular shoulder 10 on part 2 bears against the base of part 1.

During this process the sealing ring will have been forced into grooves 7 and 8 and at the same time compressed, resulting in considerable distortion of the ring in cross-section, a small part 11 of the sealing ring projecting slightly beyond the frusto-conical faces of parts 1 and 2.

In this way there will be little if any possibility of the pressure of the fluid forcing the sealing ring out of its position in the recess.

The outer end of the shank portion 3 has a blind boring 12 and to hold the valve parts firmly together with the sealing ring in position therebetween, the edge of the shank portion 3 is peened over as at 13.

It will be appreciated that due to the included angle of part 1 being greater than that of the seating, abnormal fluid pressure will cause the peripheral edge 14 of part 1 to contact the seating.

As previously explained the valve is drawn on a very large scale for clearness of illustration and consequently it can be seen the projecting part 11 of the sealing ring will make substantially linear engagement with the valve seating. Furthermore the edge 14 of part 1 will also make substantially linear engagement with the seating under excessive fluid pressure.

By stepping back part 2 in relation to part 1 plenty of room is left between the surface of part 2 and the seating 5 to allow the fluid which is under considerable pressure to act on the sealing ring to force the latter into sealing engagement with the surface of the seating.

Free flow of fluid past the valve is permitted when the latter is lifted from its seating under the pressure of the incoming fluid but if necessary part 2 may be provided with flats or grooves in its periphery.

I claim:

A valve of frusto-conical shape adapted to seat on a seating comprising an unbroken frusto-conical surface of uniform taper, said valve comprising two coaxially arranged parts, each having an annular groove, said grooves when juxtaposed forming an annular recess, a compressible sealing ring in said annular recess, said recess having a relatively narrow annular outlet defined by the junction of the outer peripheries of each of said valve parts and being of width in cross section greater than that of said annular outlet inwardly of the latter so that only a small part of the sealing ring projects therefrom for engaging the frusto-conical valve seating, the rear part of the valve on one side of the sealing ring, with respect to the direction of movement of the valve onto its seating, having a portion of its peripheral surface tapered and stepped inwardly towards the axis of the valve with respect to the peripheral surface of the front part of the valve, on the other side of the sealing ring, to provide a clearance space between the surface of the rear part and the surface of the seating, when the front part of the valve on said other side of the sealing ring is actually in contact with the seating, whereby the fluid under pressure can pass through such space and act on the sealing ring to force the latter more firmly into engagement with the seating, the included angle of the seating surface of the front part being greater than the included angle of the seating and of the inwardly stepped surface of said rear part and the largest diameter of the front part being greater than the smallest diameter of the seating.

References Cited in the file of this patent

UNITED STATES PATENTS

| | | |
|---|---|---|
| Re. 17,022 | Wilson | July 3, 1928 |
| 2,675,021 | Allin | Apr. 13, 1954 |
| 2,904,305 | Novotny | Sept. 15, 1959 |
| 2,959,188 | Kepner | Nov. 8, 1960 |

FOREIGN PATENTS

| | | |
|---|---|---|
| 9,164 | Great Britain | of 1915 |